Sept. 10, 1957  O. D. ENGLEHART  2,805,452

SEALING MEANS FOR GLAZING UNIT

Filed July 6, 1954

INVENTOR
OSCAR D. ENGLEHART

Oscar Spencer
ATTORNEY

United States Patent Office 2,805,452
Patented Sept. 10, 1957

2,805,452

SEALING MEANS FOR GLAZING UNIT

Oscar D. Englehart, Brackenridge, Pa., assignor to Pittsburgh Plate Glass Company, Allegheny County, Pa., a corporation of Pennsylvania Application July 6, 1954, Serial No. 441,566

10 Claims. (Cl. 20—56.5)

This invention relates to an improvement in multiple glazed units that comprise at least two spaced sheets of glass that are united around their peripheries by a peripheral strip. In particular, this invention relates to improved pore opening seals to be used in conjunction with such assemblies.

Conventionally, units of the type described above are fabricated by holding two sheets of glass slightly apart and heating the peripheral portion of the glass sheets until they fuse. This fusing is usually accomplished by passing an electric current through a thin film of graphite placed around the periphery of the glass in order to impart sufficient heat to the glass to heat it to fusing temperature. The graphite strip is vaporized at the high temperature produced and the glass periphery itself becomes electrically conductive while the glass is being fused. Before the glass is allowed to cool, the two sheets are further separated by means such as suction. A typical method of forming such an assembly, known commonly as an all-glass unit, is described in U. S. Patent Number 2,624,978 issued to Frederick R. Hohmann.

It is necessary that the assembly be allowed to breathe during fabrication, and for this purpose, a small opening, known as a pore hole, is drilled adjacent the corner of one of the glass sheets comprising the assembly. This provision for breathing is made in order to prevent failure of the unit due to a large pressure differential that would otherwise be established between the outside atmosphere and the air contained within the assembly when the individual glass sheets are separated.

The most difficult problem to overcome in the utilization of all glass units has been the provision of a suitable seal to close the pore hole required during fabrication of the assembly.

In order for a seal closing the pore hole to be acceptable, it must provide a closing that is both water and air tight and inhibits the passage of dust and dirt into the space enclosed by the glass sheets. The necessity for a water impervious seal is obvious. The presence of water vapor within the window assembly causes fogging of the inner surface of the sheet exposed to a temperature below the dew point of the air within the assembly. This reduces the transparency of the assembly. Therefore, it is necessary before the pore hole is sealed that dry air be inserted within the air chamber enclosed by the assembly.

Since glass is able to withstand considerable compressive forces but fractures easily upon the application of tensile stresses, it has been found advisable to force dry air within the assembly under pressure before the pore hole is sealed, thus applying a compressive force to the outer surface of the assembly in the vicinity of the periphery. When the assembly is subjected to temperature and pressure variations during use, the tendency of the outer surface of the assembly to be placed in tension is compensated for by the prestressing of the unit due to the introduction of the dry air under pressure at the time the pore hole is sealed. For most operations a pressure of slightly above one atmosphere has been found to be most suitable for providing sufficient stress compensation for the range of temperature and pressure variations to which these units can be expected to be subjected. Thus, a suitable pore hole seal is required to be strong enough to maintain the dry air within the assembly under pressure.

Accordingly, it is an object of the present invention to provide improved sealing means for the pore hole of an assembly of the type described hereinabove.

Another object is to provide an improved unitary window unit of substantially homogeneous structure enclosing an air space.

These and other objects of the present invention have been attained by providing a novel seal for the pore hole. This invention is characterized by a sealing means comprised of a plurality of discs laminated together by means of a heat softenable adhesive, which adhesive extends outwardly beyond the periphery of the discs so as to adhere the discs to the sides of the pore hole. The seal is made by inserting the laminated discs in the pore hole and applying heat and pressure to the discs so as to cause the adhesive to exude from between the discs and adhere the discs to the side walls of the pore opening.

Figure 1:
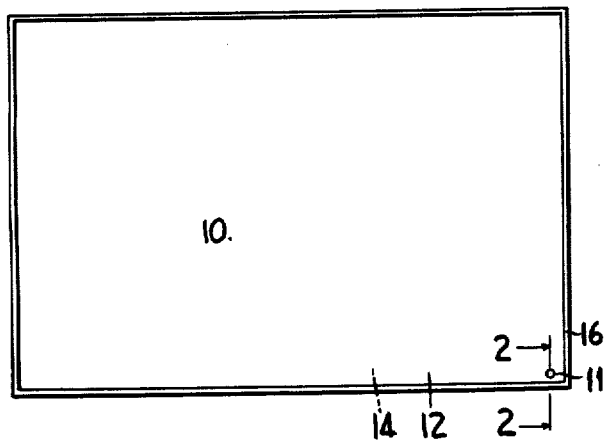
Figure 1 represents a plan view of a multiple pane glass unit provided with a pore hole, the seal for which is the subject matter of the present invention.
Figure 2:
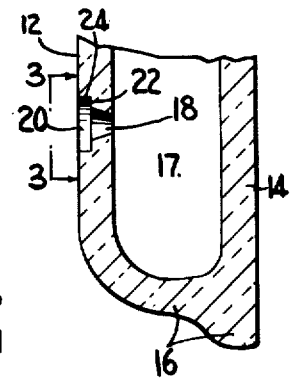
Figure 2 is a cross-sectional view of a portion of the unit depicted in Figure 1 and taken along lines 2—2 of Figure 1.
Figure 3:
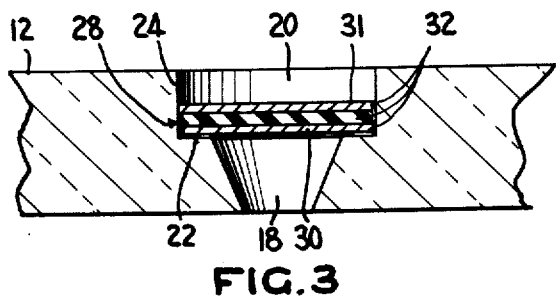
Figures 3 and 4 are enlarged cross-sectional views of various embodiments of the present invention taken along lines 3—3 of Figure 2.
Figure 4:
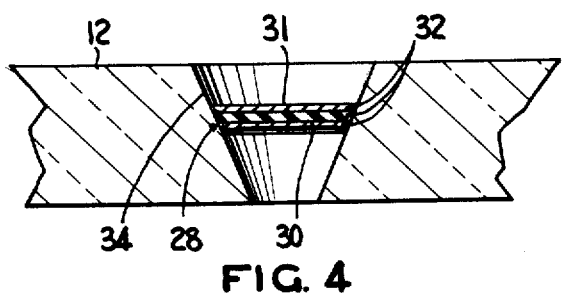

A typical multiple glazed unit is depicted by reference numeral 10 in Figure 1. This assembly 10 is provided with a pore hole 11 which is required to be sealed and which will be described in greater detail below. Glass panes 12 and 14 (Figure 2) connected around their periphery by a peripheral glass portion 16 enclose a space 17 within the assembly. The pore hole 11 is shown in Figures 2 and 3 as a substantially completely tapered aperture 18, but may be a completely tapered aperture such as shown in Figure 4. Adjacent the outer surface of pane 12 is an offset portion 20. The offset portion is provided with an inner circular shoulder 22 substantially parallel to the outer surface of the glass and a peripheral circular portion 24 substantially perpendicular to the outer surface of the glass.

Referring to Figure 3, an effective seal is provided by inserting in the opening a laminated disc 28 conforming to the shape of the offset portion 20 and having a diameter about .010 inch less than that of the offset portion 20 of the pore hole 11. The laminated disc is made up of discs 30 and 31, preferably metallic, which are adhered together by means of a thermoplastic adhesive 32. The discs 30 and 31 have a coefficient of expansion compatible with glass. The phrase "compatible with glass" as used here means substantially equal to that of glass. A metallic disc may be made of copper, aluminum, lead, or preferably a metal having substantially the same coefficient of expansion as glass, such as that sold commercially as 4750 metal. This latter metal is an alloy which contains 47 percent nickel, 50 percent iron and 3 percent tramp metals in varying quantities. These tramp metals include aluminum, silicon, and various other additives. The amount of nickel may be changed to vary the coefficient of expansion of the disc to render it more amenable to that of the specific glass composition used in the window structure. The discs 30 and 31 may also be made of glass or a thermosetting resin. It is contemplated that the two discs may be made of different materials.

The adhesive layer 32 may be any material which will soften and flow under pressure at a temperature within the approximate range of 150°–160° F. and which will firmly adhere to glass and to discs 30 and 31. For example, synthetic organic plastic materials such as "Scotch Weld" manufactured by Minnesota Mining and Manufacturing and sold as Nos. 583 and 588 adhesive have been employed. Suitable plastics which may be employed include epoxy resins having a latent catalyst such as a morpholine salt of paratoluene sulphonic acid incorporated therein, linear polyamides, A or B stage stable urea or melamine formaldehyde resins and di-isocyanate resins.

Other adhesives which may be employed include low melting alloys of lead, tin, antimony, bismuth, indium, etc. such as the following:

|   | Parts by weight |
|---|---|
| 1. Bismuth | 50 |
| Tin | 13.3 |
| Lead | 26.7 |
| Cadmium | 10.0 |
| 2. Tin | 50 |
| Indium | 50 |
| 3. Lead | 62 |
| Cadmium | 8 |
| Antimony | 30 |

These and other alloys having a melting point above the maximum temperature to which the assembly is to be exposed, i. e. about 150° F., and considerably below the melting point of the glass comprising the assembly and below the melting point of the discs 30 and 31, for example below 600° F., are usable as the adhesive material 32.

The adhesive material 32 provides a seal between the two discs 30 and 31. Upon the application of heat and pressure a small amount of the thermoplastic material 32 flows about the periphery of the discs 30 and 31 thereby providing an efficient air and water tight seal between the periphery of the discs 30 and 31 and the adjacent surface of the recessed portion 20 of the pore hole. While a mastic material is not required, it may be included in the tapered portion if desired.

The recessed pore hole 11 should be made prior to assembling the all-glass unit. It is possible to prepare the recessed pore hole by first cutting a tapered hole and then enlarging the upper portion of the hole by means of a dimet drill to form the shoulder 22 a desired distance below the surface. Another method of forming this recessed opening is by drilling with a specially shaped diamond dust impregnated metal drill.

After an all-glass unit has been assembled by uniting two sheets of glass, the laminated disc seal of the present invention is used to close the pore hole. The prepared laminated disc is placed on the shoulder 22 of the recess portion of the pore hole. The prepared disc, as applied to the pore hole, has two discs bonded together by the thermoplastic adhesive interlayer of either a synthetic resinous adhesive or a glass wetting metal or glass alloy. The seal is bonded to the shoulder 22 and periphery 24 of the recessed portion 20 of pore hole 11 by means of heat and pressure, which cause part of the adhesive to flow from between the discs to the periphery of and also around the laminated disc to seal the disc 30 to the shoulder 22 and both discs 30 and 34 to the peripheral wall 24. The heat and pressure may be supplied by forcing a heated metal rod against the surface of disc 31.

A typical disc for use with a pore hole provided in a glass sheet ⅛ inch thick with a countersunk portion having a diameter of ¼ inch and 0.04 inch deep is between 0.005 and 0.01 inch thick and 0.24 inch in diameter. Of course, these dimensions may be varied without departing from the scope of the invention. For a pore hole having a counterbore 0.25 inch in diameter and 0.08 inch in depth, for example, a disc diameter of 0.24 inch and a thickness of 0.005 inch to 0.015 inch or greater has been found suitable.

The construction shown in Figure 4 differs from that depicted in Figure 3 only in the construction of the pore hole. The pore hole 34 in Figure 4 is tapered continuously from the inner face of sheet 12 to its outer face with the larger diameter being at the outer face. The laminated disc is forced into the tapered pore opening so as to wedge it in the opening. It can be seen that in this type of seal, it is important that the coefficient of thermal expansion of the discs be substantially the same as that of the glass. Also disc 30 may have a slightly smaller outside diameter than disc 31 so as to permit a snug fit for the laminated disc 28. It is, of course, understood that the apertures may take any convenient shape consistent with the objects of the present invention.

The discs used in the foregoing embodiments are preferably of 4750 metal having a thickness range between .005 and .020 inch. However, the invention is not limited to these particular materials and thicknesses. Discs having a thickness up to about .030 inch and greater are suitable and any material having an expansion coefficient compatible with glass and which adheres to the adhesive 32 is suitable.

It is necessary that the discs have a coefficient of expansion that is compatible with glass. Hence, the use of 4750 metal is desirable. However, under certain conditions 4750 metal oxidizes and forms a corrosive coating. This difficulty may be overcome in a variety of ways, for example, by cladding the 4750 metal with a thin film of a metal difficult to oxidize, such as gold, silver or platinum, in order to provide a non-oxidizable surface to which an adhesive may be applied without too much difficulty.

By the provision of an offset portion to the pore hole, it has become possible to adhere various types of seals to the shoulder of the offset portion thereby enabling the entire glass assembly to be free of any protrusion on its outer surface no matter what type of gasket is provided, as long as the thickness of the gasket does not exceed the thickness of the offset portion. Thus, assemblies of the type described may be shipped without fear of loosening the pore hole seal in transit and special instructions need not be provided to glazers to avoid their damaging the seal by scraping with their glazing tools during mounting.

It is also understood that many additional methods for recessing a pore hole seal other than those disclosed hereinabove will be apparent to those skilled in the art. For example, the hole may be drilled and counter-drilled from the same or opposite surfaces of the glass pane, the hole may be formed while the glass is in a softened state, the hole may be formed by blasting the opposite surfaces of a glass pane with opposing blasts of abrasive having different cross-sectional area, etc., and the seal inserted within the recessed pore hole formed. The narrowest portion of the opening 11 should have a diameter not substantially less than .100 inch in order to allow free flow of air between the air space 17 and the atmosphere during fabrication of the unit.

The provision of an opening wider at its outer end than its inner end enables one to insert the laminated disc with ease. In the pore opening shown in Figures 2 and 3, the line where the disc is supported within the opening is termed the shoulder. This shoulder is preferably formed parallel to the outer surface of the sheet in order to properly orient the disc as well as to recess the latter within the opening.

It is understood that the scope of the present invention is not limited to the specific embodiments described above, but also extends to any modifications that become apparent upon reading this description and which are included within the scope of the accompanying claims.

I claim:
1. A pore closure structure for a multiple glazed unit which comprises, in combination, a pore opening in one of the glass members of the unit, said opening being larger at the exterior of the unit than at the interior of the unit, and a laminated member adhered to the walls of the pore opening by a vapor impermeable adhesive, the laminated member comprising a pair of elements conforming to the shape of the pore opening, having a coefficient of thermal expansion substantially the same as that of the glass and being adhered together by the adhesive.

2. In a pore hole seal for a window structure having two spaced glass sheets, comprising in combination, an opening extending between opposite faces of one of the glass sheets, one end of the opening being enlarged to provide a peripheral mounting shoulder for a sealing member, a sealing member disposed upon said mounting shoulder to provide a closure for the opening, which closure is in inwardly spaced relation to the outer face of the glass sheet, and an adhesive between the sealing member and the opening shoulder for retaining the sealing member in closure forming position, said sealing member comprising a laminated structure comprising a pair of elements conforming to the shape of the pore opening, having a coefficient of thermal expansion substantially the same as that of the glass and being separated by an interlayer of said adhesive.

3. The structure recited in claim 2 wherein the adhesive is a thermosetting synthetic resin.

4. The structure recited in claim 2 wherein the adhesive is an alloy that adheres to both glass and the elements and has a melting point between 150° F. and 600° F.

5. In a window construction comprising a pair of spaced parallel sheets of glass and a peripheral marginal portion connecting the sheets of glass about their peripheries thereby providing an enclosed space between said panes of glass, comprising in combination, an opening in one of said sheets of glass, an enlarged offset portion forming the part of said opening adjacent the outer surface of said pane of glass and provided with a peripheral shoulder portion substantially parallel with the outer surface of the one of said panes of glass, a sealing member disposed in the offset portion of said opening, and an adhesive disposed between said sealing member and said shoulder portion to maintain said sealing member in inwardly spaced relation with the outer surface of said glass sheet, said sealing member comprising a laminated structure comprising a pair of elements conforming to the shape of the opening, having a coefficient of thermal expansion substantially the same as that of the glass and being separated by an interlayer of said adhesive.

6. A pore hole seal structure for use with a multiple glazed unit having a pore opening in one of the glass members of the unit which seal comprises a pair of elements conforming to the shape of the pore opening, having a coefficient of thermal expansion substantially the same as that of the glass and being laminated together by an adhesive which will adhere to the elements and to the glass and which has a softening point between 150° F. and 600° F.

7. The structure recited in claim 7 wherein the adhesive is composed of a thermosetting synthetic resin which will soften and then cure at a temperature between 150° F. and 600° F.

8. The structure recited in claim 7 wherein the adhesive is composed of a metallic alloy.

9. The structure recited in claim 7 wherein the elements are composed of a metal alloy consisting essentially of 50 percent by weight of iron and 47 percent by weight of nickel.

10. A pore closure structure for a multiple glazed unit which comprises, in combination, a pore opening in one of the glass members of the unit, said opening being shaped to support a closure element, and a laminated member adhered to the walls of the pore opening by a vapor impermeable adhesive, the laminated member comprising a pair of elements conforming to the shape of the pore opening and being adhered together by the adhesive.

References Cited in the file of this patent

UNITED STATES PATENTS

| | | |
|---|---|---|
| 626,655 | Guillaume et al. | June 6, 1899 |
| 2,621,397 | Black | Dec. 16, 1952 |
| 2,683,906 | Nevins | July 20, 1954 |
| 2,688,824 | Badger et al. | Sept. 14, 1954 |

U. S. DEPARTMENT OF COMMERCE
PATENT OFFICE

CERTIFICATE OF CORRECTION

September 10, 1957

Patent No. 2,805,452

Oscar D. Englehart

It is hereby certified that error appears in the printed specification of the above numbered patent requiring correction and that the said Letters Patent should read as corrected below.

Column 6, lines 18, 22 and 24, for the claim reference numeral "7" read --6--.

Signed and sealed this 1st day of April 1958.

(SEAL)
Attest:
KARL H. AXLINE
Attesting Officer

ROBERT C. WATSON
Commissioner of Patents